US007215826B1

(12) United States Patent
Nevis et al.

(10) Patent No.: US 7,215,826 B1
(45) Date of Patent: May 8, 2007

(54) RENDERING THREE-DIMENSIONAL STREAK TUBE IMAGING LIDAR (STIL) DATA TO TWO-DIMENSIONAL CONTRAST AND RANGE MAPPINGS THEREOF

(75) Inventors: Andrew J. Nevis, Panama City, FL (US); James F. Bryan, Lynn Haven, FL (US); Brett W. Cordes, Panama City Beach, FL (US); James S. Taylor, Panama City Beach, FL (US); Mary C. Hulgan, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 789 days.

(21) Appl. No.: 10/429,330

(22) Filed: Apr. 28, 2003

(51) Int. Cl.
*G06K 9/40* (2006.01)
(52) U.S. Cl. .................. 382/275; 382/260; 382/288
(58) Field of Classification Search ............ 382/260, 382/254, 274, 275, 288
See application file for complete search history.

(56) References Cited

U.S. PATENT DOCUMENTS

| 4,575,237 | A | * | 3/1986 | Suzuki ................. 356/3.06 |
| 5,243,541 | A | * | 9/1993 | Ulich ................... 348/81 |
| 6,085,152 | A | * | 7/2000 | Doerfel ................. 702/3 |
| 6,577,265 | B2 | * | 6/2003 | Dalton et al. .......... 342/26 R |
| 6,847,587 | B2 | * | 1/2005 | Patterson et al. ........ 367/126 |

OTHER PUBLICATIONS

Gueriot, D., Bathymetric and Side-Scan Data Fusion for Sea-Bottom 3D Mosaicing, Sep. 11-14, 2000, OCEANS 2000 MTS/IEEE Conference and Exhibition, vol. 3, pp. 1663-1668.*

* cited by examiner

*Primary Examiner*—Matthew C. Bella
*Assistant Examiner*—Dennis Rosario
(74) *Attorney, Agent, or Firm*—James T. Shepherd

(57) ABSTRACT

A rendering method converts three-dimensional streak tube imaging lidar (STIL) data to two-dimensional contrast and range maps thereof. A temporal portion of the STIL data is processed for each pixel of the three-dimensional image. Each temporal portion includes a Gaussian-like portion and non-Gaussian-like portions. Processing for each pixel includes: (i) removing noise from the temporal portion using the non-Gaussian-like portions wherein a filtered form of the Gaussian-like portion is formed, (ii) determining a non-integer center of mass of the filtered form of the Gaussian-like portion with the non-integer center of mass being indicative of a range value, and (iii) applying a mathematical interpolation function to determine amplitude of the filtered form of the Gaussian-like portion at the range value defined by the non-integer center of mass. The amplitude so-determined is indicative of a contrast value. The process is repeated for all pixels to thereby produce range and contrast maps.

6 Claims, 2 Drawing Sheets

RENDERING THREE-DIMENSIONAL STREAK TUBE IMAGING LIDAR (STIL) DATA TO TWO-DIMENSIONAL CONTRAST AND RANGE MAPPINGS THEREOF

ORIGIN OF THE INVENTION

The invention described herein was made in the performance of official duties by a employees of the Department of the Navy and may be manufactured, used, licensed by or for the Government for any governmental purpose without payment of any royalties thereon.

FIELD OF THE INVENTION

The invention relates generally to image data processing, and more particularly to a method for rendering (i.e., converting) three-dimensional streak tube imaging lidar (STIL) data of the bottom of a body of water to two-dimensional contrast and range mappings thereof for visual display and/or for use by automatic target recognition schemes.

BACKGROUND OF THE INVENTION

Streak Tube Imaging Lidar (STIL) is used for the imaging and detection of targets in a turbid medium such as water or air. In terms of imaging an underwater region, STIL uses a pulsed fan beam to illuminate a thin strip on the ocean bottom that corresponds to a single (cross-track) line in the rendered imagery. Photon returns of the ocean bottom and corresponding adjacent water column are captured in a CCD array, essentially capturing a thin volumetric slice, or shot of the ocean in terms of volumetric pixels or voxels as they are known. Each pixel can be represented by a temporal profile which contains an approximate Gaussian shaped curve of the bottom return.

The three-dimensional nature of STIL data yields large data files which require relatively large amounts of time to process and/or transmit. Accordingly, the three-dimensional STIL data is often rendered into two-dimensional forms thereof. In general, STIL data can be rendered into two-dimensional contrast and range maps by finding the peak value of the temporal profile of each pixel. The magnitude of the peak value corresponds to the contrast and the location of the peak value corresponds to the range.

Current methods of rendering involve searching the temporal profile for a matched Gaussian curve fit. However, this technique is limited in that the prior estimates of the Gaussian curve width must be known. That is, problems arise when the true width of the Gaussian curve in the temporal profile is different from the fitted width. In addition, prior to the Gaussian curve match fit, dark field and ambient light fields must be determined and removed from the temporal profile. The current methods use a separate dark field file to remove the dark field values and must estimate a $K_{sys}$ value (i.e., a measure of how turbid the medium is in terms of how rapidly the STIL system's laser beam decays) to compute the ambient light field exponential decay curve. However, this means that a separate dark field file must be provided. Also, poor estimates of the $K_{sys}$ value yield poor rendering results.

SUMMARY OF THE INVENTION

Accordingly, it is an object of the present invention to provide a method of rendering three-dimensional STIL data into two-dimensional contrast and range mappings thereof.

Another object of the present invention is to provide a reduced-error method of rendering three-dimensional STIL data into two-dimensional contrast and range values.

Other objects and advantages of the present invention will become more obvious hereinafter in the specification and drawings.

In accordance with the present invention, a method is provided for the conversion or rendering of three-dimensional streak tube imaging lidar (STIL) data to two-dimensional contrast and range maps thereof. The STIL data associated with a turbid region is such that it can be reproduced as a three-dimensional image resolved into pixels. A temporal portion of the STIL data is processed for each pixel. Each temporal portion includes a Gaussian-like portion and non-Gaussian-like portions. Processing for each pixel includes: (i) removing noise from the temporal portion using the non-Gaussian-like portions wherein a filtered form of the Gaussian-like portion is formed, (ii) determining a non-integer center of mass of the filtered form of the Gaussian-like portion with the non-integer center of mass being indicative of a range value, and (iii) applying a mathematical interpolation function to determine amplitude of the filtered form of the Gaussian-like portion at the range value defined by the non-integer center of mass. The amplitude so-determined is indicative of a contrast value. A range map is formed from a plurality of range values determined for the pixels of the image. A contrast map is formed from a plurality of contrast values determined for the pixels of the image.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention converts or renders three-dimensional STIL data into two-dimensional range and contrast maps for simplifying transmission and/or viewing thereof. The generation of such STIL data can be achieved in accordance with the teachings of, for example, U.S. Pat. Nos. 5,467,122 and 6,400,396. Accordingly, it is to be understood that the methods/systems used to generate the STIL data are not limitations of the present invention.

As is well known in the art, STIL systems/methods can be used to image turbid air or water regions. The image that can be produced using such data is three-dimensional in nature with each elemental portion of the image being defined by a pixel. However, for the reasons presented above, the data is frequently better transmitted and/or viewed in two dimensions.

Figure 1:
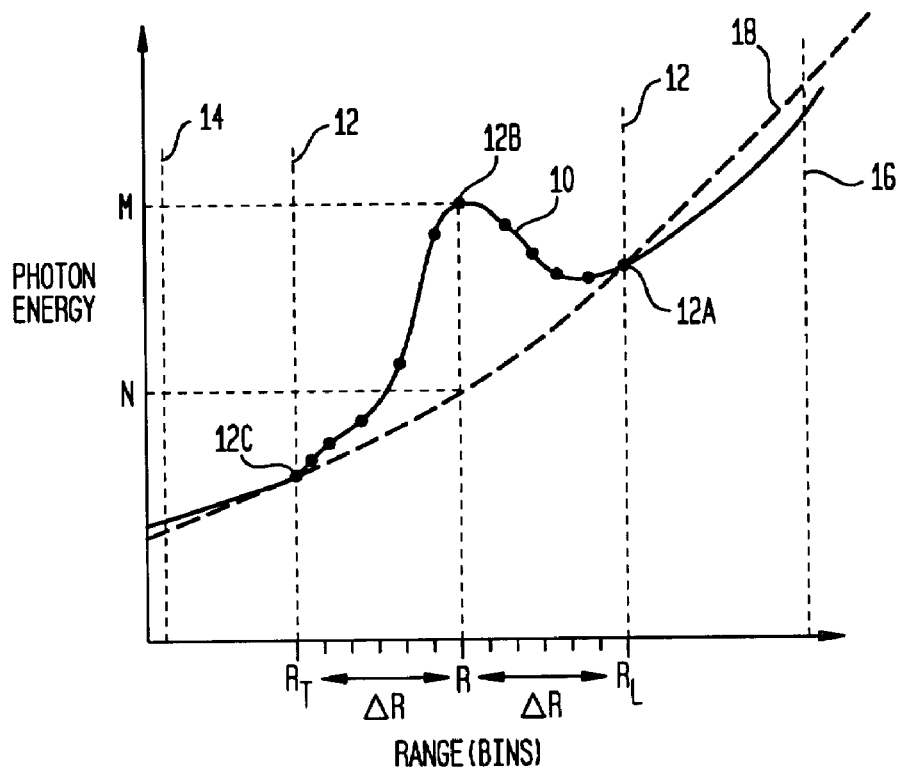
FIG. 1 depicts the temporal profile of a bottom return as a function of range associated with a single pixel from a three-dimensional STIL data set where the profile includes dark field noise, ambient noise and backscatter noise.

By way of example, FIG. 1 illustrates the temporal profile 10 of a STIL return from the bottom of a body of water (e.g., ocean) in which a target is present. Temporal profile 10 is a plot of return photon energy as a function of integer range (bins) values associated with a single pixel of the three-dimensional image. More specifically, temporal profile 10 is defined by (i) a combination of the actual signal (i.e., light energy in the form of photons) being returned from the illuminated region, (ii) dark field noise or the noise inherent in the STIL imaging system even when no interrogation energy is output therefrom, (iii) ambient light noise which, in the case of underwater imaging, is due to sunlight from above the water's surface, and (iv) backscatter noise caused by the interrogation light energy interacting with itself (as opposed to a target) to generate a portion of the return signal amplitude.

Figure 2:
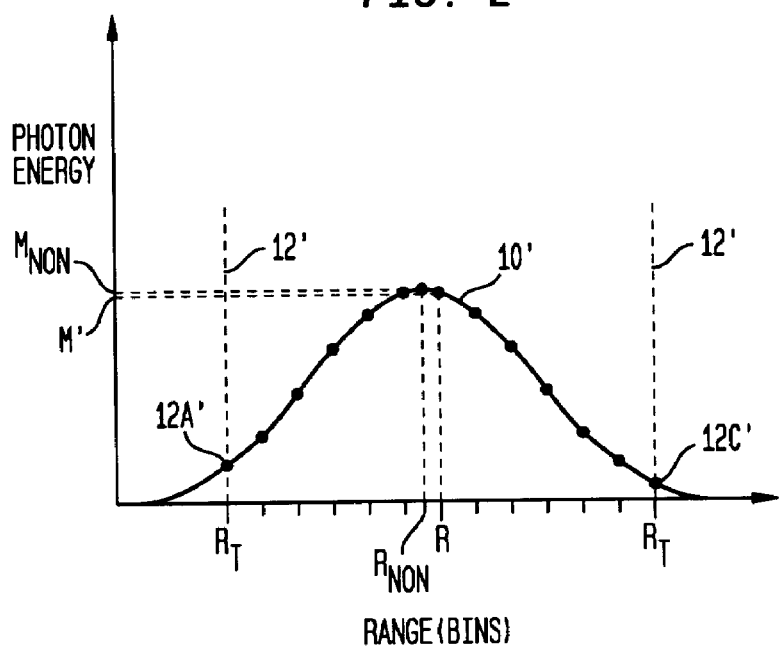
FIG. 2 depicts the temporal profile of FIG. 1 with dark field noise, ambient noise and backscatter noise removed therefrom in accordance with the present invention.

As is known in the art, if dark field, ambient and backscatter noise were removed from temporal profile 10, the typical actual signal return would resemble a Gaussian-like temporal profile 10' that is illustrated in FIG. 2. Thus, it is clear that a Gaussian-like portion (defined between dashed lines 12 in FIG. 1) of temporal profile 10 is caused by the target in the region being imaged. The portions of temporal profile 10 before (i.e., between dashed line 14 and dashed line 12) and after (i.e., between dashed line 12 and dashed line 16) Gaussian-like portion 12 are non-Gaussian-like in nature. The integer range value R and its associated peak amplitude of Gaussian-like portion 12 is indicative of the target's range while the magnitude M of temporal profile 10 at range R is indicative of a contrast value. However, the integer nature of the range bins means that the true peak amplitude of Gaussian-like portion 12 is between two range bins. Furthermore, since temporal profile 10 includes a variety of noise effects as described above, the contrast value associated with the target is actually the value of magnitude M less the various noise effects.

In accordance with the present invention, each pixel of STIL data is processed to determine the range and contrast value associated with the pixel's peak amplitude associated with the relevant signal (i.e., target) portion of temporal profile 10. The resulting collection of range values for an image's pixels defines a two-dimensional range map of the target. Similarly, the resulting collection of contrast values for an image's pixels defines a two-dimensional contrast map of the target. The process of the present invention will now be explained with the aid of FIG. 3 as well as continued reference to FIGS. 1 and 2.

Figure 3:
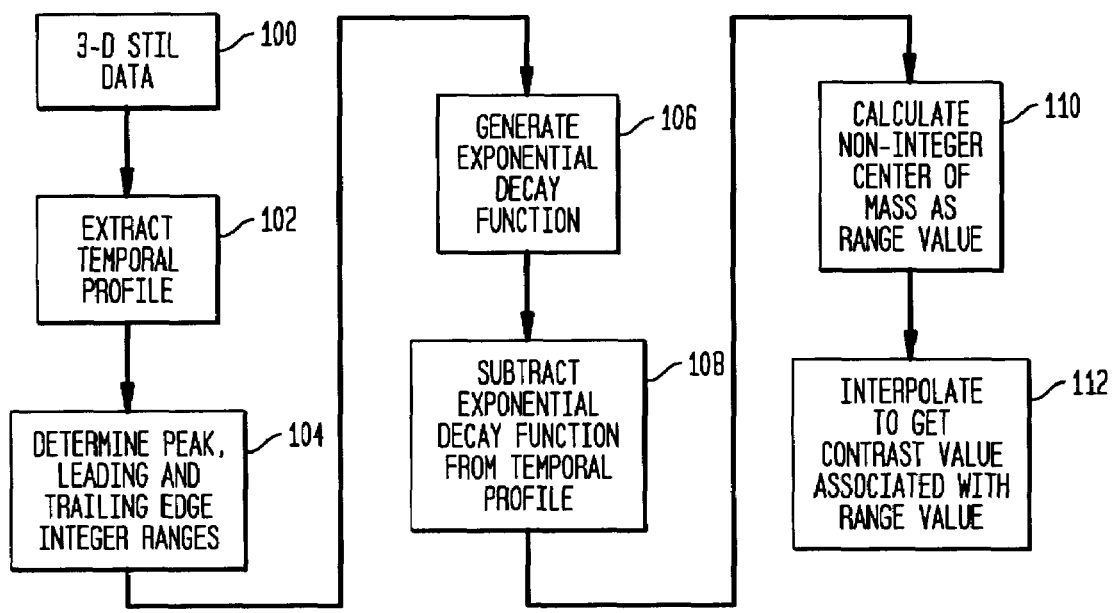
FIG. 3 is a flow diagram of the method of rendering a pixel of three-dimensional STIL data into range and contrast values in accordance with the present invention.

As shown in FIG. 3, a first step 100 provides three-dimensional STIL data where the data can be read in terms of one thin volumetric slice or shot. At step 102, a temporal profile 10 corresponding to a single pixel of the shot is extracted. Next, step 104 determines the range associated with a leading edge 12A, peak 12B and trailing edge 12C of Gaussian-like portion 12. This step involves determining peak 12B associated with the integer range (bin) value R, and then adding a specified range offset (e.g., number of range bins) □R to establish an integer range $R_L$ associated with leading edge 12A and subtracting the range offset to establish an integer range $R_T$ associated with trailing edge 12C. Range offset □R is set by user and is based on prior observations of many temporal profiles recorded under a variety of conditions.

The next two steps (i.e., steps 106 and 108) in the present invention remove or filter out the dark field, ambient and backscatter noise present in temporal profile 10 (FIG. 1) in order to essentially leave a filtered temporal profile 10' (FIG. 2) that is free from noise effects. Specifically, step 106 generates an exponential decay function fitted over all values of temporal profile 10 outside of Gaussian-like portion 12, but including those values associated with leading edge 12A and trailing edge 12C. The fitted exponential decay function, illustrated graphically by dashed line curve 18 in FIG. 1, is of the well known form $$Ae^{B(k-p)}$$

where k defines a set of integer range values from 1 to $R_T$ and from $R_L$ to an upper range value of interest, p is set to equal $R_L$, and A and B are values solved for using a least squares error method.

At step 108, the noise defined by exponential decay function 16 is subtracted from temporal profile 10 to yield filtered temporal profile 10' where, at integer range (bin) value R, the amplitude M' of filtered temporal profile 10' is defined as amplitude M (FIG. 1) minus the associated noise N (FIG. 1) at integer range value R.

To more accurately determine the contrast value for the target indicated in filtered temporal profile 10', a non-integer center of mass calculation is performed at step 110 on the Gaussian-like portion 12' (i.e., between leading edge 12A' and trailing edge 12C') of filtered temporal profile 10'. This calculation defines a non-integer range $R_{NON}$ that falls between two integer range (bin) values. The amplitude $M_{NON}$ at non-integer range $R_{NON}$ is determined at step 112 by means of mathematical interpolation. In tests of the present invention, the LaGrange interpolation technique utilizing three integer range values provided good results.

The above-described process steps are performed for each pixel of the STIL image data. The resulting set of non-integer range values $R_{NON}$ define a range map while the resulting set of corresponding amplitudes $M_{NON}$ define a contrast map.

The advantages of the present invention relative to the prior art Gaussian curve matching method are numerous. The present method does not need to assume the width of the Gaussian curve. Furthermore, removal of the dark field is computed directly from the temporal profile and does not require an external dark field file. Still further, noise due to ambient light and backscatter are removed by direct computation from the temporal profile thereby eliminating the need to estimate a $K_{sys}$ value as is required by the Gaussian curve matching method. These differences result in significantly improved rendering results, particularly under turbid conditions.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for converting three-dimensional streak tube imaging lidar (STIL) data to two-dimensional contrast and range maps thereof, comprising the steps of:
   providing STIL data associated with a turbid region wherein said STIL data can be reproduced as a three-dimensional image resolved into pixels; and
   processing a temporal portion of said STIL data for each of said pixels wherein each said temporal portion includes a Gaussian-like portion and non-Gaussian-like portions and wherein, for each of said pixels, said step of processing includes the steps of
   (i) removing noise from said temporal portion by (i) generating an exponential decay function using said non-Gaussian-like portions, and (ii) subtracting said exponential decay function from said Gaussian-like portion, wherein a filtered form of said Gaussian-like portion is formed, (ii) determining a non-integer center of mass of said filtered form of said Gaussian-like portion wherein said non-integer center of mass is indicative of a range value, and (iii) applying a mathematical interpolation function to determine amplitude of said filtered form of said Gaussian-like portion at said range value defined by said non-integer center of mass wherein said amplitude is indicative of a contrast value, wherein a range map is formed from a plurality of range values determined for said pixels, and wherein a contrast map is formed from a plurality of contrast values determined for said pixels.

2. A method according to claim 1 wherein said mathematical interpolation function is a LaGrange interpolation function.

3. A method for converting three-dimensional streak tube imaging lidar (STIL) data to two-dimensional contrast and range maps thereof, comprising the steps of:

providing STIL data associated with a turbid region wherein said STIL data can be reproduced as a three-dimensional image resolved into pixels; and processing, for each of said pixels, a temporal portion of said STIL data as a function of range, wherein each said temporal portion includes (i) a Gaussian-like portion having a leading edge and a trailing edge and (ii) non-Gaussian-like portions leading up to said trailing edge and extending beyond said leading edge, and wherein, for each of said pixels, said step of processing includes the steps of (i) removing noise from said temporal portion by (i) generating an exponential decay function using said STIL data associated with said leading edge, said trailing edge and said non-Gaussian-like portions, and (ii) subtracting said exponential decay function from said Gaussian-like portion, wherein a filtered form of said Gaussian-like portion is formed, (ii) determining a non-integer center of mass of said filtered form of said Gaussian-like portion wherein said non-integer center of mass is indicative of a range value, and (iii) applying a mathematical interpolation function to determine amplitude of said filtered form of said Gaussian-like portion at said range value defined by said non-integer center of mass wherein said amplitude is indicative of a contrast value, wherein a range map is formed from a plurality of range values determined for said pixels, and wherein a contrast map is formed from a plurality of contrast values determined for said pixels.

4. A method according to claim 3 wherein said mathematical interpolation function is a LaGrange interpolation function.

5. A method for converting three-dimensional streak tube imaging lidar (STIL) data to two-dimensional contrast and range maps thereof, comprising the steps of:

providing STIL data associated with a turbid region wherein said STIL data can be reproduced as a three-dimensional image resolved into pixels; and processing, for each of said pixels, a temporal portion of said STIL data as a function of integer range values, wherein each said temporal portion includes (i) a Gaussian-like portion having a leading edge, a trailing edge and a peak position defining a maximum amplitude of said Gaussian-like portion between said leading edge and said trailing edge and (ii) non-Gaussian-like portions leading up to said trailing edge and extending beyond said leading edge, and wherein, for each of said pixels, said step of processing includes the steps of (i) determining a corresponding one of said integer range values associated with each of said leading edge, said trailing edge and said peak position, (ii) removing noise from said temporal portion by (i) generating an exponential decay function using said STIL data associated with said leading edge, said trailing edge and said non-Gaussian-like portions, and (ii) subtracting said exponential decay function from said Gaussian-like portion, wherein a filtered form of said Gaussian-like portion is formed, (iii) determining a non-integer center of mass of said filtered form of said Gaussian-like portion wherein said non-integer center of mass is indicative of a non-integer range value between two of said integer range values, and (iv) applying a mathematical interpolation function that uses said corresponding one of said integer range values associated with said peak position to determine amplitude of said filtered form of said Gaussian-like portion at said non-integer range value, wherein said amplitude is indicative of a contrast value, wherein a range map is formed from a plurality of range values determined for said pixels, and wherein a contrast map is formed from a plurality of contrast values determined for said pixels.

6. A method according to claim 5 wherein said mathematical interpolation function is a LaGrange interpolation function.

* * * * *